No. 729,264. Patented May 26, 1903.

UNITED STATES PATENT OFFICE.

EUGENE A. BOURLON, OF NEW CANEY, TEXAS.

INSECTICIDE.

SPECIFICATION forming part of Letters Patent No. 729,264, dated May 26, 1903.

Application filed February 19, 1903. Serial No. 144,142. (No specimens.)

*To all whom it may concern:*

Be it known that I, EUGENE A. BOURLON, a citizen of the United States, residing at New Caney, in the county of Montgomery and State of Texas, have invented new and useful Improvements in Insecticides, of which the following is a specification.

My invention relates to a new and improved spraying solution to be used as an insecticide especially for the destruction of insects upon cotton-plants and other similar vegetable growths.

The solution consists of a combination of the following mixtures in the proportions stated: one pound of oil of chenopodium and three quarts of alcohol; one pound of oil of stramonium-leaves and three quarts of alcohol; one pound of oil of stramonium-seeds and three quarts of alcohol; forty gallons of magnolia-bark tea.

The spray is prepared by mixing the oil of chenopodium, stramonium-leaves, and stramonium-seeds with the alcohol in the proportions stated and then combining said mixtures. This is infused with forty gallons of magnolia-bark tea, which is made by boiling for a period of two hours, under cover, a mixture of green magnolia-bark, either from the roots or the trunk of a tree, in the proportions of one pound of bark to one gallon of water. After the tea has been boiled for the specified period it is allowed to cool and is then strained, after which it is in condition to be mixed with the ingredients above mentioned.

The compound is adapted to be used in any suitable form of spraying apparatus and when sprinkled upon a plant will kill all the insects thereon. It is particularly adapted for protecting cotton-plants from what is commonly known as the "boll-weevil."

The oil of chenopodium is preferably formed from the seeds of Jerusalem oak or wormseed.

I claim—

1. The herein-described composition of matter, consisting of oil of chenopodium, oil of stramonium, alcohol, water, and extract of magnolia-bark.

2. The herein-described insecticide, consisting of one pound of oil of chenopodium, one pound of oil of stramonium-leaves, one pound of oil of stramonium-seeds, nine quarts of alcohol, and forty gallons of water and magnolia extract, mixed.

EUGENE A. BOURLON.

Attest:
J. T. RUCKS,
J. W. LEWIS.